United States Patent
McGuire

(10) Patent No.: US 7,234,613 B2
(45) Date of Patent: Jun. 26, 2007

(54) GRANULAR MATERIAL QUICK CHANGE VALVE ASSEMBLY

(76) Inventor: Patrick D. McGuire, 441 S. Jackson St., Media, PA (US) 19063

( * ) Notice: Subject to any disclaimer, the term of this patent is extended or adjusted under 35 U.S.C. 154(b) by 168 days.

(21) Appl. No.: 11/176,584

(22) Filed: Jul. 7, 2005

(65) Prior Publication Data

US 2006/0006358 A1 Jan. 12, 2006

Related U.S. Application Data

(60) Provisional application No. 60/587,354, filed on Jul. 12, 2004.

(51) Int. Cl.
*B65D 47/00* (2006.01)
*B67D 3/00* (2006.01)

(52) U.S. Cl. .................. 222/548; 222/555; 251/208; 141/286; 141/301

(58) Field of Classification Search ............. 251/205, 251/208; 222/502, 547, 548, 555; 141/286, 141/297, 301
See application file for complete search history.

(56) References Cited

U.S. PATENT DOCUMENTS

| | | | | | |
|---|---|---|---|---|---|
| 2,670,105 | A | * | 2/1954 | Huhn | 222/251 |
| 3,006,506 | A | * | 10/1961 | Germano | 222/49 |
| 4,108,338 | A | * | 8/1978 | Howland et al. | 222/286 |
| 4,179,048 | A | * | 12/1979 | Pickett | 222/44 |
| 5,704,588 | A | * | 1/1998 | Korfgen et al. | 251/208 |
| 5,901,886 | A | * | 5/1999 | Grindstaff et al. | 222/557 |

\* cited by examiner

Primary Examiner—Eric Keasel
Assistant Examiner—John K. Fristoe, Jr.
(74) Attorney, Agent, or Firm—Charles N. Quinn, Esq.

(57) ABSTRACT

A valve assembly including a downwardly directed funnel, a substantially cylindrical body position within a cylindrical base and a cylindrical valve within the cylindrical body atop of the funnel includes a baffle, a latch and a planar semi-circular surface about which the cylindrical valve adapted to rotate to open and close the valve.

5 Claims, 4 Drawing Sheets

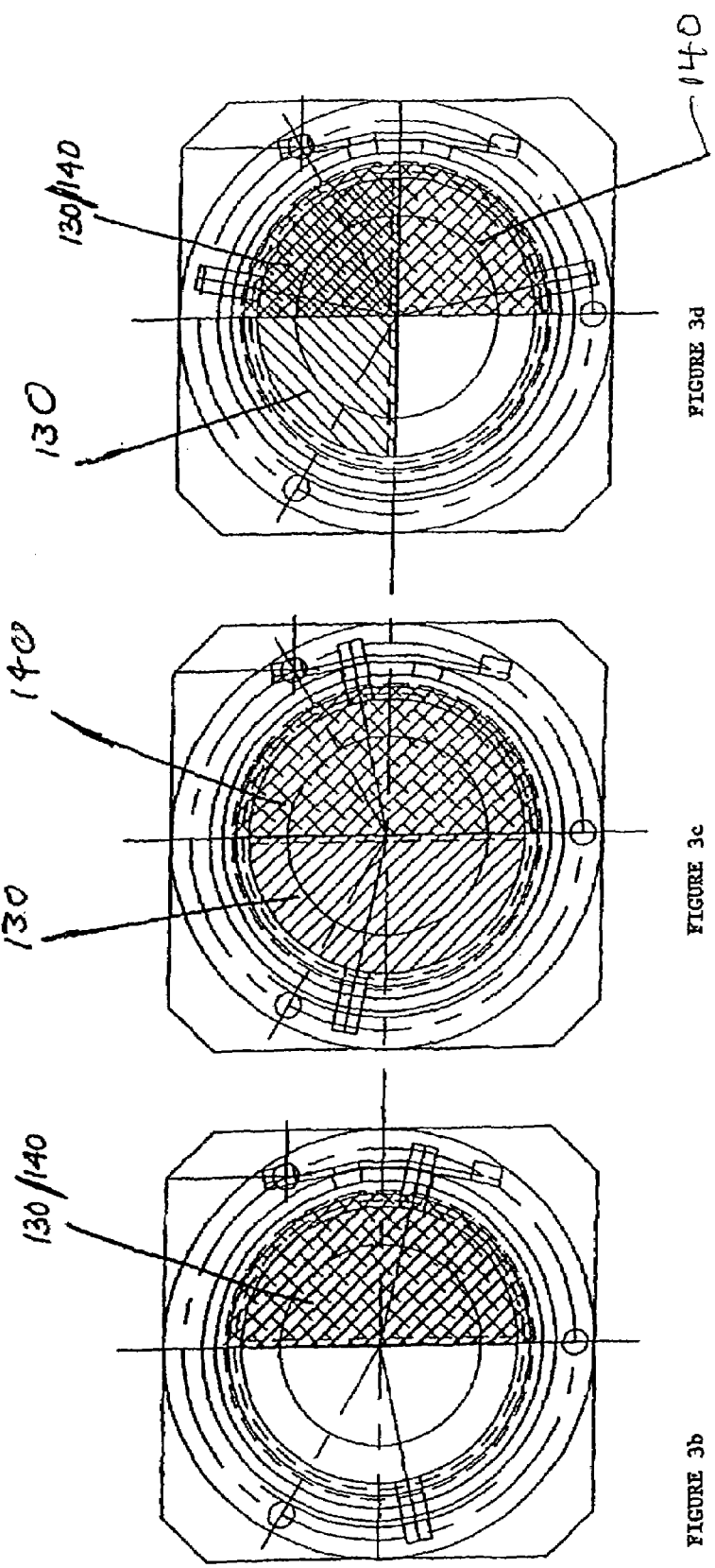

GRANULAR MATERIAL QUICK CHANGE VALVE ASSEMBLY

CROSS-REFERENCE TO RELATED APPLICATION

This patent application claims the benefit of the priority of U.S. provisional patent application Ser. No. 60/587,354 filed 12 Jul. 2004 in the name of Patrick D. McGuire with such priority being claimed under 35 USC 119.

BACKGROUND OF THE INVENTION

1. Field of Invention

The invention disclosed herein relates generally to a valve assembly for controlling flow of materials into a materials processing machine. More specifically, preferred embodiments of the disclosed invention relate to a valve assembly for controlling flow of granular material into a plastics processing machine, wherein the valve assembly is actuated via rotational motion of a valve.

2. Description of the Related Art

Existing granular material flow control valves generally are horizontally actuated and are commonly called slide shut-off valves. Slide shut-off valves depend on gravity to convey granular material and are commonly comprised of a rectangular metal slide plate with a circular or rectangular hole located asymmetric to the lateral centerline of the rectangular slide plate. The plate of a slide shut-off valve is mechanically contained between two stationary metal plates, to allow linear motion of the slide plate from a closed position to a fully open position. The center of a hole in the slide plate aligns with the center of the material source device, such a hopper or any point in between.

The slide shut-off device by its nature is prone to fouling caused by the dust contained within the granular material, thus rendering over time an inoperable valve requiring frequent maintenance and/or component replacement. The slide shut-off valve does not allow for fast material changes or self-purging. The slide shut-off valve is associated with undue material bridging and requires significant housekeeping. High maintenance costs are associated with the slide shut-off valve, which is also prone to invasion by moisture.

The slide shut-off valve is bulky and cumbersome to transport and usually remains located with the material processing equipment. In particular, the slide shut-off valve is not readily portable; material tends to bridge in a slide-shut off valve. The slide shut-off valve exhibits poor housekeeping because the very action of the slide plate, between the extremes of motion forces minute dust particles of the material to enter the atmosphere and larger particles to fall to the floor or other horizontal surface. A slide shut-off valve cannot effectively seal hygroscopic materials from atmospheric moisture.

SUMMARY OF THE INVENTION

Disclosed herein is a valve assembly, which preferably comprises a quick changing rotary valve. Preferred embodiments of the valve assembly include a substantially cylindrical base, a downwardly-directed funnel, a substantially cylindrical body, a substantially cylindrical valve and a planar semicircular surface.

The substantially cylindrical base preferably includes an upwardly-opening base inlet end and a downwardly-opening base discharge end. The downwardly-directed funnel is preferably positioned within the substantially cylindrical base for convergent discharging of material flowing through the valve assembly. The substantially cylindrical body is preferably positioned within the substantially cylindrical base atop the downwardly-directed funnel. The substantially cylindrical body is preferably secured to the substantially cylindrical base with mounting pins in order to preclude rotational motion of the substantially cylindrical body with respect to the substantially cylindrical base.

Preferred embodiments of the valve assembly also include a substantially cylindrical valve positioned within the substantially cylindrical body atop the downwardly-directed funnel. The substantially cylindrical valve preferably includes a downwardly-opening valve discharge end and an upwardly-opening valve inlet end. The downwardly-opening valve discharge end preferably includes an edge delineating an enclosed semicircular portion of the downwardly-opening valve discharge end and an open semicircular portion of the downwardly-opening valve discharge end. The substantially cylindrical valve also includes a baffle extending from a side edge portion of the upwardly-opening valve inlet end toward the edge.

Preferred embodiments of the valve assembly also include a latch for controlling angular position of the substantially cylindrical valve. Preferred embodiments of the valve assembly also include a planar semicircular surface positioned between the downwardly-opening valve discharge end and a divergent end of the funnel. The planar surface is preferably a portion of the discharge end of the substantially cylindrical body.

In preferred embodiments, the substantially cylindrical valve is adapted to rotate one-hundred-eighty degrees about an axis common to the substantially cylindrical valve, the substantially cylindrical base and the substantially cylindrical body. The substantially cylindrical valve preferably rotates between a valve-open position, in which the planar semicircular surface and the enclosed semicircular portion are in substantial alignment, and a valve-closed position, in which the planar semicircular surface and the open semicircular surface are in substantial alignment. Preferred embodiments of the valve assembly include a latch for controlling angular position of the valve.

Preferred embodiments of the valve assembly further include a pair of stop pins at the top of the upwardly-opening valve inlet end that are positioned about one-hundred-eighty degrees apart from one another. The stop pins preferably prevent the substantially cylindrical valve from rotating more than one-hundred-eighty degrees. In some aspects, the valve assembly may further comprise a base plate for securing the substantially cylindrical base to a materials processing machine such that a divergent end of the downwardly-directed funnel is aligned with an intake of the materials processing machine. In other aspects, the valve assembly include a hopper adapter for securing a hopper to the valve assembly.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings:

FIG. 3b is a partially-sectioned top view showing a preferred embodiment of the substantially cylindrical valve of FIG. 3a in a valve-open position;

FIG. 3c is a partially-sectioned top view showing a preferred embodiment of the substantially cylindrical valve of FIGS. 3a–b in a valve-closed position; and FIG. 3d is a partially-sectioned top view showing a preferred embodiment of the substantially cylindrical valve of FIGS. 3a–c in an intermediate position between the valve-open position and the valve-closed position.

DETAILED DESCRIPTION OF THE INVENTION

Figure 1:
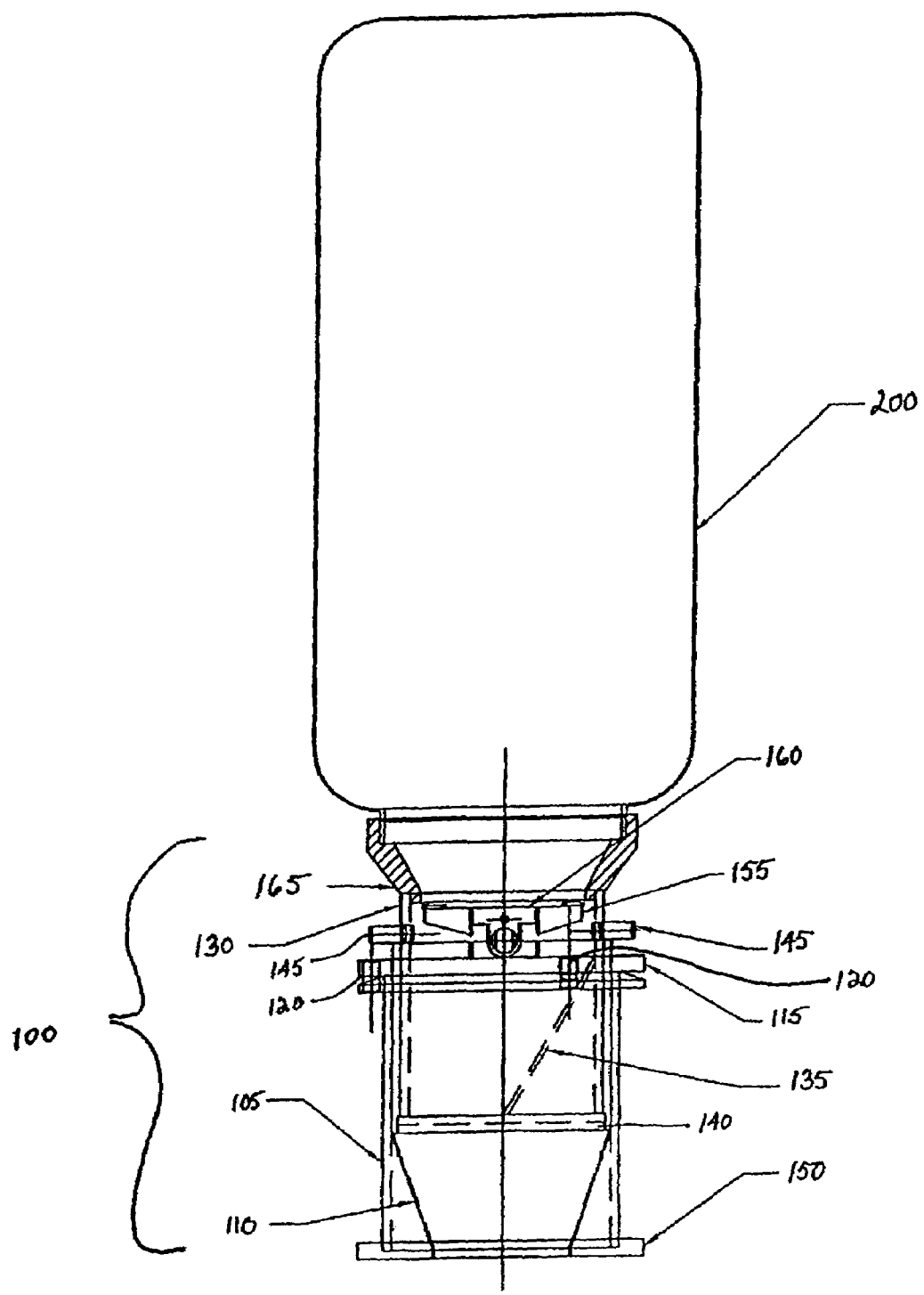
FIG. 1 is a partially-sectioned front view showing a hopper in combination with a preferred embodiment of a valve assembly manifesting the invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 2:
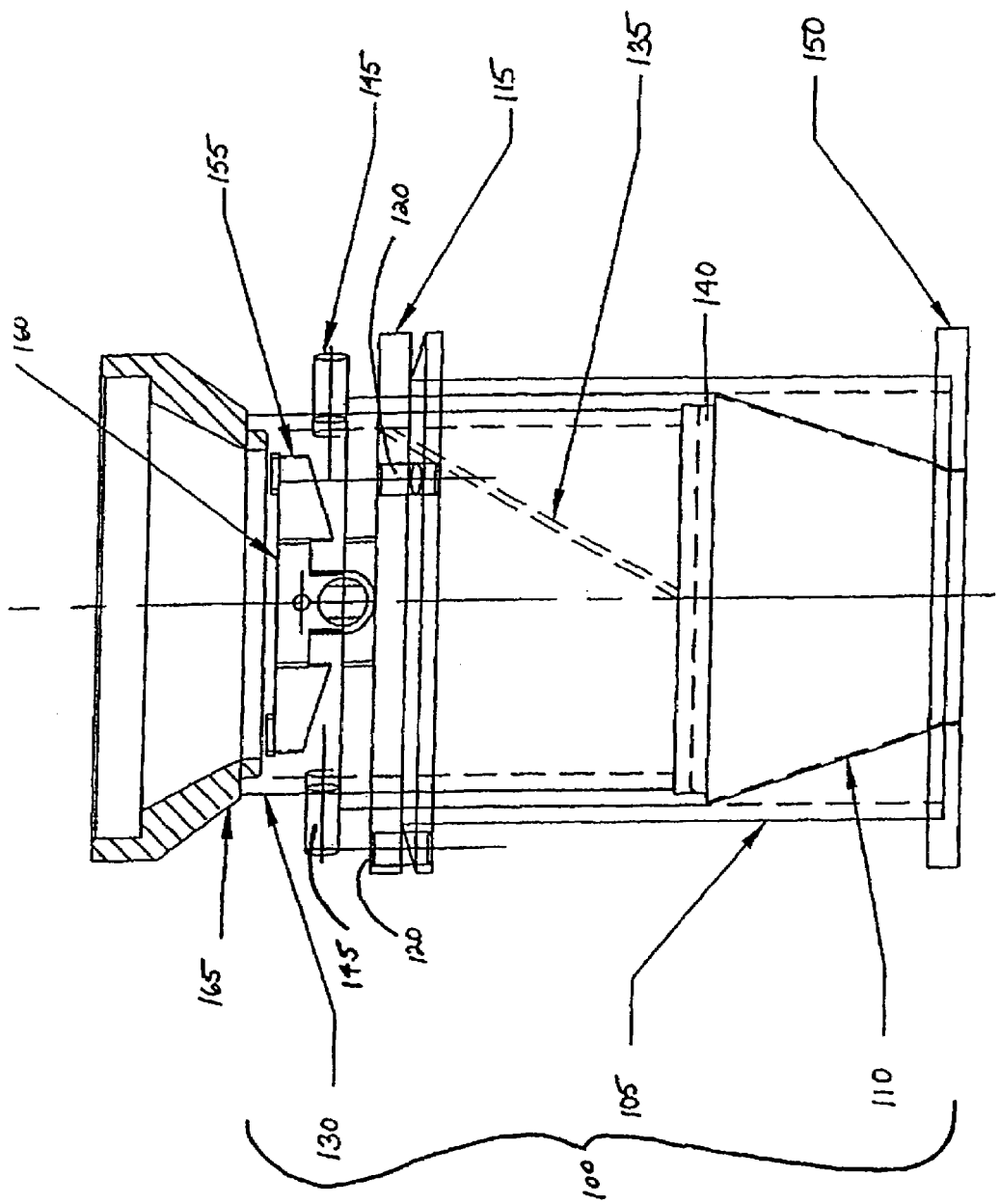
FIG. 2 is a partially-sectioned front view showing the preferred embodiment of the valve assembly shown in FIG. 1.
Figure 3A:
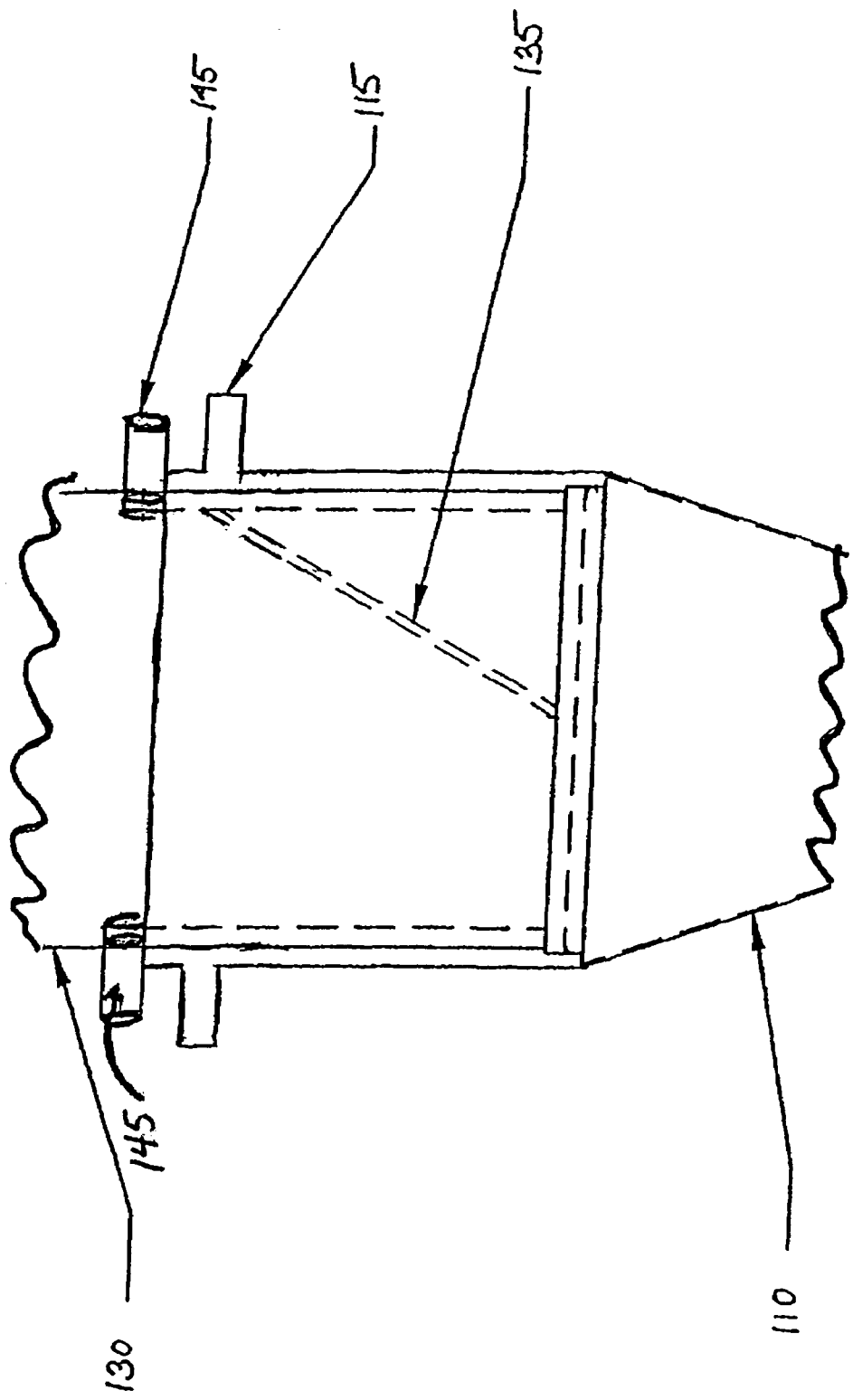
FIG. 3a is a front view showing the preferred embodiment of the combination of a substantially-cylindrical valve, a substantially cylindrical body valve, a planar semicircular surface and a downwardly-directed funnel.

With principal reference to FIGS. 1 and 2, a valve assembly is shown and designated generally 100. In FIG. 1, valve assembly 100 is shown in conjunction with a hopper 200 and, in FIG. 2, valve assembly 100 is shown without hopper 200. Valve assembly 100 is preferably a rotary motion valve assembly used to control, dispense, convey, transfer and/or store free-flowing, granular materials that originate from a material source, such as hopper 200, and are sent to product manufacturing equipment or an open container located below.

Preferred embodiments of valve assembly 100 include a substantially cylindrical base 105, a downwardly-directed funnel 110 (converging end down), a substantially cylindrical body 115, a substantially cylindrical valve 130 and a planar semicircular surface 140. Valve assembly 100 is preferably a rotary motion valve used to control, dispense, convey, transfer and/or store free-flowing, granular materials from a material source, such as hopper 200, for example. Material flow is preferably controlled by rotationally positioning substantially cylindrical valve 130 with respect to substantially cylindrical body 115, which in turn controls the alignment of a semi-circular orifice at the discharge end of substantially cylindrical valve 130 with planar semicircular surface 140. This is discussed in greater detail below with principal reference to FIGS. 3a–d.

Hopper 200 can preferably be attached, for example, to the top of substantially cylindrical valve 130 via gravity. Granular material is preferably fed into the inlet 160 of valve assembly 100 and is ultimately discharged into a materials processing machine or open container located below the downwardly-directed funnel 110.

Substantially cylindrical base 105 is preferably mechanically mounted to the destination device, such as a plastics injection molding machine, via the use of base plate 150. Downwardly-directed funnel 110 is preferably positioned therein. Downwardly-directed funnel 110 preferably directs downward flowing granular material from the discharge end of substantially cylindrical body 115 to a discharge end of substantially cylindrical base 105. The discharge opening of downwardly-directed funnel 110 is sized appropriately for the destination device (e.g. to match the inlet of a materials processing machine).

The substantially cylindrical body 115 preferably includes a semi-circular orifice which has a diameter about equal to the inside diameter of the substantially cylindrical body 115. The semi-circular orifice is preferably located near the discharge end of the substantially cylindrical body 115. A planar semicircular surface 140 is preferably positioned between the downwardly-opening valve discharge end and a divergent end of downwardly-directed funnel 110.

Mounting pins 120 are preferably positioned in a flange located near the top of substantially cylindrical body 115, which is preferably concentric to substantially cylindrical body 115, and preferably shares a common diameter about the centerline of substantially cylindrical body 115. The centerlines of mounting pins 120 are preferably vertically aligned such as to engage corresponding holes in a similar flange located at the top of substantially cylindrical base 105 thus preventing rotary motion of substantially cylindrical body 115 relative to substantially cylindrical base 105. The outside diameter of the central aperture through substantially cylindrical body 115 is preferably about equal to the inside diameter of substantially cylindrical base 105 less any necessary clearance to permit relative linear motion along common centerlines of both components.

The outside diameter of substantially cylindrical valve 130 is preferably about equal to the inside diameter of substantially cylindrical body 115, less any necessary clearance to permit relative rotary motion along common centerlines of both components. There is thus a secure interface between substantially cylindrical valve 130 and substantially cylindrical body 115. There is preferably a low coefficient of friction between substantially cylindrical valve 115 and substantially cylindrical body 115 in order to minimize the amount of torque required for actuation of valve assembly 100. Substantially cylindrical valve 130 preferably includes a baffle 135 located on the inside diameter of substantially cylindrical valve 130. Baffle 135 is preferably angled downward such as to direct material flow to the semi-circular orifice at the discharge end of substantial cylindrical valve 130.

With principal reference to FIGS. 3a–d, substantially cylindrical valve 130 is preferably free to rotate in either a clockwise or counterclockwise direction (as viewed from the inlet) with respect to substantially cylindrical body 115 and planar semicircular surface 140. The angle of rotation is limited to about one-hundred-eighty degrees of rotation, and angular position of substantially cylindrical valve 130 is preferably controlled by latch 155 shown in FIGS. 1 and 2. Two stop pins 145 are radially located atop substantially cylindrical valve 130 for mechanically stopping rotational motion in either direction. In this respect, the position of the substantially cylindrical valve 130 may either be in a valve-open position (see FIG. 3b), a valve-closed position (see FIG. 3c) or an intermediate position (see FIG. 3d) for partial and/or measured flow of materials. Thus, substantially cylindrical valve 130 is manually positionable to be fully closed (prohibiting material flow) in one extreme or to be fully open (allowing maximum material flow) in the other extreme. Substantially cylindrical valve 130 can be manually rotated to an infinite number of positions between the extremes, thus providing a means to control the rate of material flow through valve assembly 100.

With principal reference to FIG. 1, an adapter, herein referenced as a hopper adapter and designated as 165 can be used to secure attachment of hopper 200 to valve assembly 100. Hopper adapter 165 is preferably affixed above substantially cylindrical valve 130 to provide a means to efficiently receive material from an external source such as, but not limited to, hopper 200 or other material sources. Other possible material sources include, for example, pipe, tubing or any mechanical means that presents granular material to inlet 160 of substantially cylindrical valve 130 through a suitable adapter.

Valve assembly 100 includes means for quickly removing the substantially cylindrical valve 130 and substantially cylindrical body 115 together from substantially cylindrical base 105 without the need of tools or skilled labor. Further, with valve assembly 100 in the valve-closed position prior to removal, the removal of substantially cylindrical valve 130 and substantially cylindrical body 115 prohibits any residual material contained therein and any material in the material source device (e.g. hopper 200) from leaving from substantially cylindrical valve 130. This allows fast material changes to improve manufacturing efficiency, reduce production costs and improve profits.

Preferred embodiments of valve assembly 100 are suitable, by way of nonlimiting example, for controlling the flow of granular material in such industries as plastics, rubber, food processing pharmaceuticals, agriculture and packaging. Preferred embodiments of valve assembly 100 allow for fast material changes and self-purging. Tools are preferably not necessary as valve assembly 100 is preferably manually actionable. Valve assembly 100 may be cleaned easily and allows for a linear proportional controlled feed rate with an infinitely selectable linear feed rate between the extremes controlled by stop pins 145. Material bridging is preferably reduced, thereby reducing downtime, and there is balanced flow through valve assembly 100, which is preferably sealed to protect hygroscopic materials from atmospheric moisture.

Valve assembly 100 also allows for improved housekeeping, requires only low amounts of maintenance and restricts the entry of minute material particles (e.g. dust) into the atmosphere. Safety is thus improved by eliminating the amount of granular material spilling to the floor and other surfaces. Valve assembly 100 is preferably also lightweight, portable and suitable for human transportation.

What is claimed is:

1. A valve assembly, comprising:
   a substantially cylindrical base, comprising:
      an upwardly-opening base inlet end; and
      a downwardly-opening base discharge end;
   a downwardly-directed funnel positioned within the substantially cylindrical base for convergent discharging of material flowing through the valve assembly;
   a substantially cylindrical body positioned within the substantially cylindrical base atop the downwardly-directed funnel, the substantially cylindrical body being secured to the substantially cylindrical base with pins to preclude rotational motion of the substantially cylindrical body with respect to the substantially cylindrical base;
   a substantially cylindrical valve positioned within the substantially cylindrical body atop the downwardly-directed funnel, comprising:
      an upwardly-opening valve inlet end;
      a downwardly-opening valve discharge end having an edge delineating an enclosed semicircular portion of the downwardly-opening valve discharge end and an open semicircular portion of the downwardly-opening valve discharge end; and
      a baffle extending from a side edge portion of the upwardly-opening valve inlet end toward the edge; and
   a latch for controlling angular position of the substantially cylindrical valve; and
   a planar semicircular surface positioned between the downwardly-opening valve discharge end and a divergent end of the funnel;
   wherein the substantially cylindrical valve is adapted to rotate one-hundred-eighty degrees about an axis common to the substantially cylindrical valve, the substantially cylindrical base and the substantially cylindrical body and between a valve-open position, in which the planar semicircular surface and the enclosed semicircular portion are in substantial alignment, and a valve-closed position, in which the planar semicircular surface and the open semicircular surface are in substantial alignment.

2. The valve assembly of claim 1, comprising a pair of stop pins positioned about the upwardly-opening valve inlet end one-hundred-eighty degrees apart from one another, the pins preventing the substantially cylindrical valve from rotating more than one-hundred-eighty degrees.

3. The valve assembly of claim 1, comprising a base plate for securing the substantially cylindrical base to a materials processing machine such that a divergent end of the downwardly is aligned with an intake of the materials processing machine.

4. The valve assembly of claim 1, comprising a hopper adapter for securing attachment of a hopper to the valve assembly.

5. A combination of the valve assembly of claim 4 with the hopper.

* * * * *